Feb. 23, 1954 — M. P. REHORN — 2,669,901
OPTICAL SYSTEM ADAPTABLE TO STEREOSCOPIC
PROJECTORS, VIEWERS, AND TELEVISION
Filed July 11, 1950
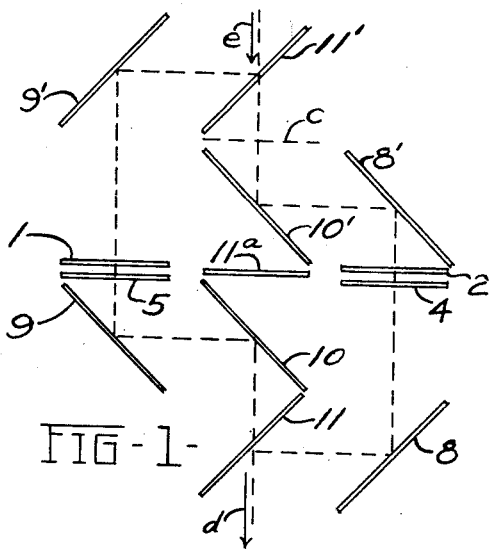
FIG-1-
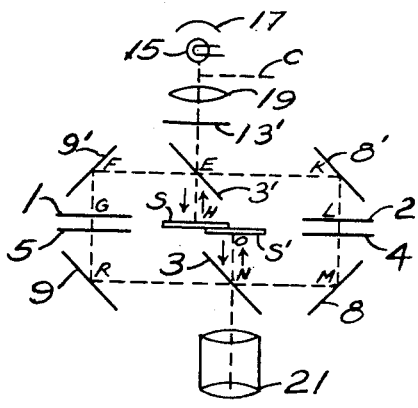
FIG-4-
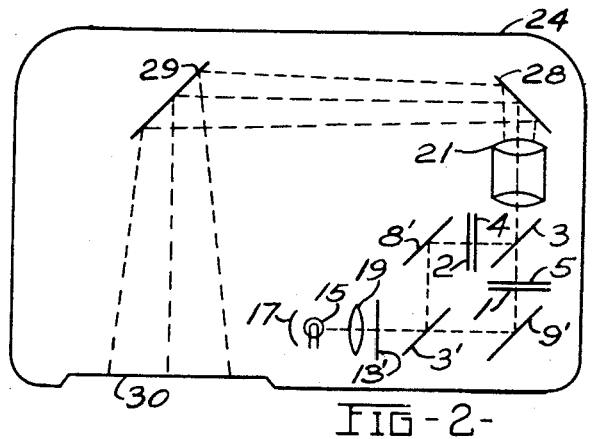
FIG-2-
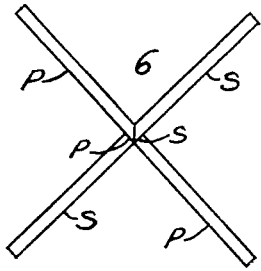
FIG-5-
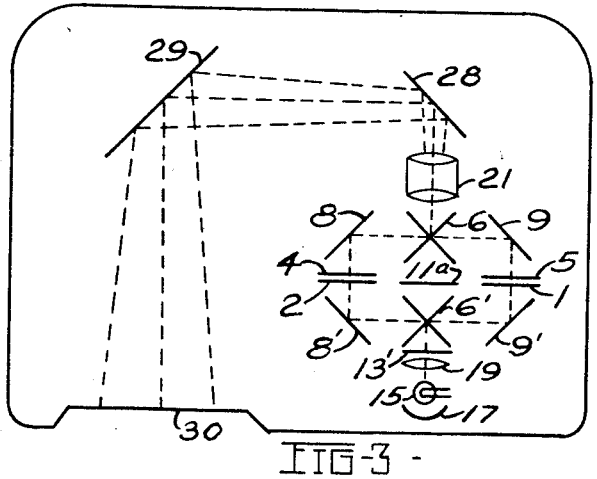
FIG-3-
INVENTOR
Miles P. Rehorn Patented Feb. 23, 1954

2,669,901

UNITED STATES PATENT OFFICE 2,669,901

OPTICAL SYSTEM ADAPTABLE TO STEREO-SCOPIC PROJECTORS, VIEWERS, AND TELEVISION

Miles Parker Rehorn, Nashville, Tenn.

Application July 11, 1950, Serial No. 173,040

5 Claims. (Cl. 88—26)

My invention relates to apparatus and methods for use in connection with stereoscopic projectors, viewers and television.

At the present time there are on the market projectors which are designed to project a pair of stereoscopic transparencies in superimposed position onto a non-depolarizing projection screen in cross polarized light. Such projectors are equipped with polarizing filters placed in the respective light beam paths. The superimposed images are viewed through polarizing goggles or filters corresponding to the filters within the projector. Through such goggles this composite image is seen in stereoscopic relief.

Such projectors require two light sources, two objective lenses, two condenser lenses and two of still other items usually included in the interior of a good projector. The reason for doubling the items named is that of a problem presented by polarized light when employed in the above described manner: when two polarizing filters are superimposed with their polarizing axes crossed the result is blackness or opaqueness as far as light transmission is concerned. It is therefore impossible to superimpose filters and stereo transparencies in an ordinary projector with a single optical system and obtain a composite cross polarized image that may be viewed stereoscopically. However if instead of superimposing the polarizing filters, the light beams are passed respectively through the two filters and superimposed, as on the above mentioned non-depolarizing screen, the result is not opaqueness but rather two kinds of polarized light each vibrating in a different direction from that of the other.

Now if some means were provided to cause the light passing through the two polarizing filters and through the two stereo transparencies to be merged into a single beam, after it passes through the two polarizing filters, and the two images, but before it reaches an objective lens, only one objective lens would be needed. The two beams having become one would continue to be cross polarized as they pass through the objective lens and thence to the non-depolarizing screen.

Also if some way were provided to cause the rays of light from a single light source to be divided after it passes through a single condenser lens and a single heat filter so that part of the rays are directed through one polarizing filter which is placed in conjunction with one stereo image and part through the other polarizing filter which is placed in conjunction with the other stereo image, then only one light source, condenser lens, heat filter and reflector would be necessary.

Accordingly, one object of this invention is to provide an optical arrangement or system by means of which light beams passing respectively through polarizing filters individual thereto, each of which is in conjunction with one of two stereo images, may be merged into a single beam or path before passing through an objective lens.

A second object of this invention is to provide an optical arrangement or system by means of which a light beam from a single light source may be divided into two separate beams, then the two beams directed respectively through two stereo transparencies and through the two polarizing filters with which the two stereo images are respectively actively related.

There are also other useful applications of the optical system or arrangement featured in the invention other than those already indicated relative to three-dimensional projectors. For example it is believed that they may play an important part in simplifying three-dimensional television, using a polarizing system such as disclosed in my copending applications, viz., Serial Number 767,569, filed August 8, 1947, Stereoscopic Viewing Methods and Apparatus, now Patent No. 2,631,496, March 17, 1953, and Serial Number 217,555, filed March 26, 1951, Stereoscopic Television.

Also, there are viewers of various types into which may be incorporated the said optical arrangement or system in order to accomplish a three-dimensional view similar to that of three-dimensional projection.

Other objects of the invention will be evident from the following description.

Referring to the accompanying drawings:

Fig. 1 is a diagrammatic view of an optical arrangement or system embodying one form of my invention.

Figs. 2, 3 and 4 are similar views, each showing a different modification.

Fig. 5 is an enlargement of a double half mirror 6, such as shown, for example in Fig. 3.

Referring to the drawings, let us assume that the planes 1 and 2 are each occupied by one of a pair of stereoscopic images. These planes may be in various relative positions and at various angles, as, for example, at right angles to each other as shown in Fig. 2, or parallel or in the same plane, as in Fig. 1. According to the various objects and applications of the invention indicated above, the stereoscopic images may be film transparencies, glass slides, opaque prints, television images on the face of their respective picture tubes or other type images. Let us further assume that each image is illuminated by some means; they may be self illuminating as when composed of phosphorescent materials, or they may depend upon light shining through them or upon them. Let it be assumed, for example, that they are ordinary stereoscopic transparencies illuminated by a light source. Accordingly the action in the system shown in Fig. 1 is as follows:

Light rays or a light beam from any suitable source and propagated in the direction $e$ is directed against the half mirror 11' at an angle of 45 degrees. A portion of the light is reflected at right angles by the half mirror and again reflected by the mirror 9' and thereby directed to the image plane 1. The light which passes through the half mirror 11' is reflected by the mirror 10' and again by the mirror 8' which is parallel with the mirror 10'. The light is thereby directed to the image plane 2. Thus the images at the image planes 1 and 2 are illuminated by the divided radiation from a single source.

Light rays from the image at the plane 1 pass through the polarizing filter 5 where they are polarized in a specific direction. Said light now carrying the polarized image is reflected by the mirror 9 and again by the mirror 10 and is directed by the mirror 10 to the half mirror 11 through which it passes in the direction of the arrow $d$. The light rays from the image at the plane 2 pass through the polarizing filter 4 where they are polarized in a direction at right angles to that of the first image. Said light rays now carrying this polarized image are reflected by the mirror 8 and again by the half mirror 11. Thus the radiations from the two images are merged. The result is that the two cross polarized images are apparently and for all practical purposes superimposed at the plane $c$. It will be observed that in this optical action the polarizing filters have not been superimposed but only the light rays passing through them. The light rays from each of the image planes 1 and 2 only pass through one filter, the radiation from the two image planes 1 and 2, only being combined after having passed through their respective filters. For this reason the polarized stereo images appear in their superimposed relation at the plane $c$ without the opaque effect which would result from cross polarization if the two filters were actually superimposed. The method illustrated in Fig. 1 results rather in a cross polarized image similar to that produced on a non-depolarizing screen in ordinary three-dimensional projection.

This resulting composite image may be viewed either directly or through a suitable lens, or it may be picked up by an objective lens and projected onto a non-depolarizing screen. In any case it is seen in three-dimensional relief when viewed through a suitable polarizing medium, for example polarizing goggles worn by an observer.

Opaque prints may be substituted for the film transparencies at the image planes 1 and 2, provided a space is left between them and the polarizing filters 4 and 5 so that a light source from the side, above or below may shine between the filters and the print.

Figs. 1 to 4 show various combinations and arrangements of parts by which a single light source 15 (Figs. 2, 3, 4) serves the same purpose as separate light sources for lighting the image planes 1 and 2.

Where it is desired, a single light source 15 may be used also to obviate the need of duplicating auxiliary parts, such as reflectors, condensers, and the like, where such auxiliary parts are used with and individual to the light sources. This can be done by using the optical system shown in Fig. 2, for example, comprising a single light source 15, a single reflector 17 and a single condenser 19. This system includes opaque mirrors 8' and 9' and the transparent mirror 3'. The mirrors 8' and 9' are parallel as shown and opposite the image planes 2 and 1 respectively, also at an angle of 45° to them. The half mirror 3' is in the same plane as the half mirror 3 and opposite the mirrors 8' and 9' as shown. This optical arrangement including mirrors 8', 9' and 3' constitutes a second principal feature of the invention. It divides the rays of light from the light source 15, half of them being reflected at right angles by the half mirror 3' and directed to mirror 8' and again reflected at right angles by mirror 8'. The other half of the rays pass through the half mirror 3' to the mirror 9' where they are reflected at right angles by mirror 9'.

Fig. 2 shows the unit incorporated within the case 24 of a rear projection apparatus. As here shown the reflector 17, the light source 15, condenser lens 19 and the heat filter 13' are positioned in a line at right angles to the objective lens 21, which arrangement is more suitable to this type projector-conserving space. The opaque mirror 28 reflects the projected beam at right angles to the opaque mirror 29 which reflects the beam to the non-depolarizing screen 30.

It may be desirable under certain conditions and in certain uses of the invention to have the image planes 1 and 2 parallel or so arranged that the radiations from the two image planes are directed toward each other as shown, for example, in Fig. 3 wherein the radiations from the image planes after polarization and reflection by the mirrors 8 and 9 are directed toward a common point. This is made possible by using the double half mirror 6 which is made up, generally speaking, of two half mirrors crossed as shown. Such a mirror, as shown in Fig. 5, is preferably in four pieces so that the first surfaces S and P of the mirrors are uninterrupted. Supposing that the crossed half mirror 6 of Fig. 3 is of the construction and in the position shown in Fig. 5 the light rays from the two image planes 1 and 2 pass respectively through the polarizing filters 4 and 5 and (after reflection by the mirrors 8 and 9) are reflected at right angles by the mirror surfaces S and P. The mirrors 6 unite the rays from the separated images so that they travel together.

Fig. 3 also shows a double half mirror 6', identical in construction with the double half mirror 6, interposed between the light source 15 and image planes 1 and 2 and operating to divide the radiation and direct it to the opaque mirrors 8' and 9' which reflect and direct it to the image planes 1 and 2. The opaque partition 11ª (Figs. 1 and 3) is for blocking and absorbing unwanted light rays.

Fig. 3 shows another projector arrangement which eliminates the necessity of more than one reflector, condenser, or heat filter. The added mirror unit 6' makes this possible. This optical arrangement is shown as applied to a rear projector.

Fig. 4 illustrates a modification in which the light from the light source 15 passes through the condenser lens 19 and heat filter 13' to the half mirror 3'. The portion of the light reflected by the half mirror 3' is again reflected by the mirror 8', passes through the image plane 2 and polarizing filter 4, is reflected by the mirror 8 and again reflected in part by the half mirror 3 and is directed against the mirror surface S'. The radiation reflected from the surface S' passes through the half mirror 3 and objective lens 21. The portion of the light which passes through the half mirror 3' is reflected by the mirror surface S to the half mirror 3' which reflects it in part to the mirror 9', the reflected light continuing in the path indicated by dotted lines to the half mirror 3 by which it is reflected. The polarized rays bearing the two images are thus united at the half mirror 3 and together pass through the objective lens 21. By staggering the half mirrors 3' and 3 and the mirror surfaces S and S', so that the distance G F E H is equal to the distance E K L and the distance L M N O equals the distance N R G, the amount of light passing from the light source 15 to the separate images 1 and 2 will be more evenly divided; also the images 1 and 2 when superimposed will appear of equal size at the plane c (Fig. 4).

While some of the optical systems herein shown, for example, Figs. 1 and 4, are arranged for forward projection, and others (Figs. 2 and 3) incorporate rear projection, it is evident that any of these systems may be adapted to either forward or rear projection.

Various combinations and arrangements of parts other than herein illustrated and other modifications may be resorted to within the scope of my invention as defined in the appended claims.

I claim:

1. An optical system comprising the combination of a pair of light transmitting elements having image bearing plane surfaces bearing respectively the images of a stereoscopically related pair of images, polarizing filters individual to said images, a light source, means for dividing a light beam projected from said light source into separate light beams and directing one said separate beam to one image bearing surface and directing the other separate beam to the other image bearing surface, said dividing means comprising a half mirror in the path of the said projected light beam and spaced from said light source and passing part of the light without substantial change in its direction and reflecting another part of the light in a different direction, said polarizing filters being positioned in the respective paths of the separate light beams and polarizing the light beams, and means for merging the polarized light beams and causing them to propagate in the same direction after the merger.

2. The combination set forth in claim 1, the said light directing means comprising reflecting mirrors positioned between the light source and the image bearing surfaces with their reflecting surfaces diagonal to said image bearing surfaces.

3. The combination defined in claim 2, the said half mirror being interposed between the light source and the said reflecting mirrors.

4. The combination set forth in claim 3, the half mirror being in a line with the light source and one of said reflecting mirrors and permitting a portion of the light beam to pass therethrough and to the last mentioned mirror without substantial change in direction, and reflecting another portion of the light beam in a different direction, the other said reflecting mirror being in the line of the light reflected from the half mirror.

5. The combination set forth in claim 1, the said merging means comprising a transparent body through which one light beam is transmitted without substantial change in direction, said body having a reflecting surface in the path of the other light beam by which the latter is reflected and thereby given the same direction as the transmitted beam.

MILES PARKER REHORN.

References Cited in the file of this patent

UNITED STATES PATENTS

| Number | Name | Date |
|---|---|---|
| 1,503,766 | Pictet et al. | Aug. 5, 1924 |
| 1,899,032 | Handschiegl | Feb. 28, 1933 |
| 1,959,498 | Planskoy | May 22, 1934 |
| 2,084,350 | Land | June 22, 1937 |
| 2,178,145 | Manly | Oct. 31, 1939 |
| 2,246,817 | Sauer | June 24, 1941 |
| 2,249,061 | Styll | July 15, 1941 |
| 2,255,631 | Schulman | Sept. 9, 1941 |
| 2,263,316 | Ryan | Nov. 18, 1941 |
| 2,282,947 | Sherbinin | May 12, 1942 |
| 2,301,826 | Steudel et al. | Nov. 10, 1942 |
| 2,348,410 | Pastor | May 9, 1944 |
| 2,437,061 | Wright | Mar. 2, 1948 |
| 2,449,287 | Flood | Sept. 14, 1948 |

FOREIGN PATENTS

| Number | Country | Date |
|---|---|---|
| 519,488 | Great Britain | Mar. 28, 1940 |
| 706,588 | Germany | May 29, 1941 |
| 634,890 | Great Britain | Mar. 29, 1950 |